United States Patent

Merbach et al.

(10) Patent No.: US 8,630,521 B2
(45) Date of Patent: Jan. 14, 2014

(54) OPTICAL CABLE

(75) Inventors: Gerhard Merbach, Neustadt (DE); Guenter Wuensch, Neustadt (DE)

(73) Assignee: CCS Technology, Inc., Wilmington, DE (US)

( * ) Notice: Subject to any disclaimer, the term of this patent is extended or adjusted under 35 U.S.C. 154(b) by 41 days.

(21) Appl. No.: 13/084,766

(22) Filed: Apr. 12, 2011

(65) Prior Publication Data

US 2011/0188820 A1  Aug. 4, 2011

Related U.S. Application Data

(63) Continuation of application No. PCT/EP2009/063356, filed on Oct. 13, 2009.

(30) Foreign Application Priority Data

Oct. 15, 2008  (DE) .............. 20 2008 013 688 U

(51) Int. Cl.
  *G02B 6/44*  (2006.01)
(52) U.S. Cl.
  USPC ............................. 385/111; 57/13
(58) Field of Classification Search
  USPC ............................. 385/111; 57/13
  See application file for complete search history.

(56) References Cited

U.S. PATENT DOCUMENTS

| | | | | |
|---|---|---|---|---|
| 4,269,024 A | * | 5/1981 | Ashpole et al. | 57/232 |
| 4,341,440 A | * | 7/1982 | Trezeguet et al. | 385/111 |
| 4,468,088 A | * | 8/1984 | van der Hoek | 385/111 |
| 5,060,467 A | * | 10/1991 | Gill et al. | 57/13 |
| 5,339,378 A | * | 8/1994 | Simonds et al. | 385/100 |
| 2006/0147164 A1 | * | 7/2006 | Bau et al. | 385/111 |
| 2008/0031571 A1 | * | 2/2008 | Crownover | 385/31 |

FOREIGN PATENT DOCUMENTS

| | | | | |
|---|---|---|---|---|
| EP | 0459415 A2 | 12/1991 | | G02B 6/44 |
| GB | 1488528 | 10/1977 | | G02B 5/16 |
| WO | WO00/58768 | 10/2000 | | G02B 6/44 |
| WO | WO03/083518 A2 | 10/2003 | | |
| WO | WO2004/051336 A1 | 6/2004 | | G02B 6/44 |

* cited by examiner

*Primary Examiner* — Chalie Peng
*Assistant Examiner* — Peter Radkowski
(74) *Attorney, Agent, or Firm* — Russell S. Magaziner

(57) ABSTRACT

A micromodule cable having optical transmission elements arranged in a helically wound manner around a longitudinal axis by at least 360° in a longitudinal direction where the lay length is 100 times of the diameter of the optical cable. The cable is stable across a wide temperature range.

3 Claims, 5 Drawing Sheets

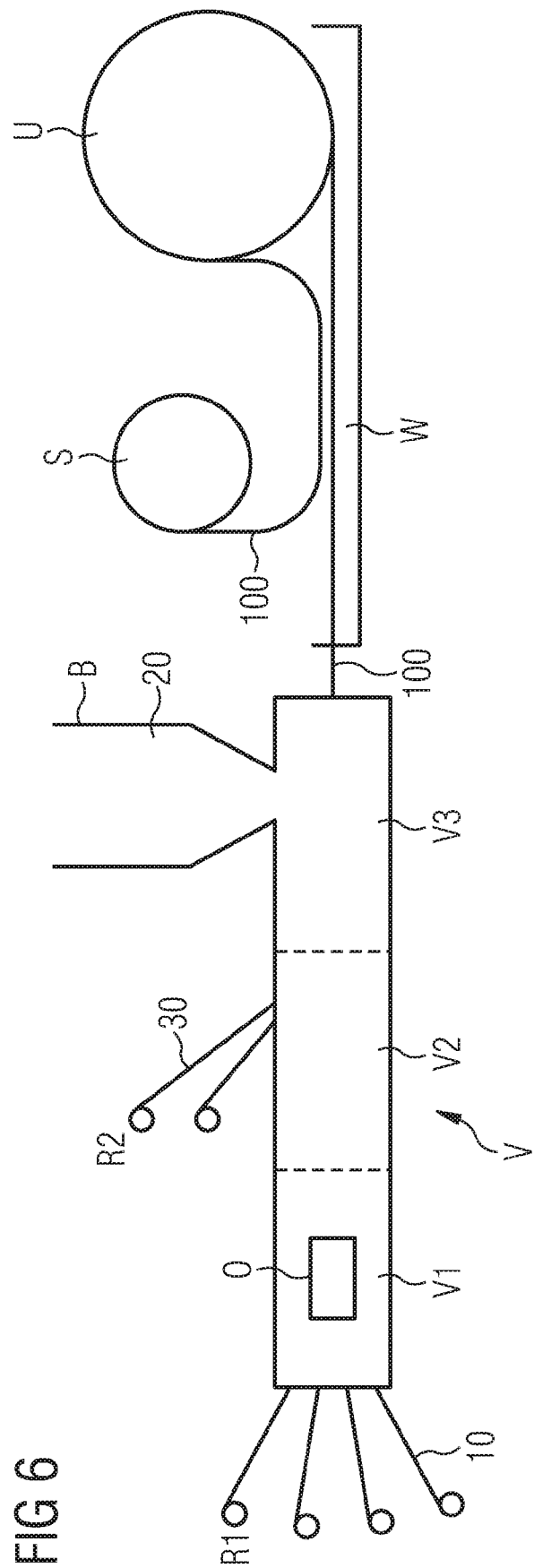

OPTICAL CABLE

RELATED APPLICATIONS

This application is a continuation of International Application No. PCT/EP09/063,356 filed on Oct. 13, 2009, which claims the benefit of German Application No. 202008013688.1, filed Oct. 15, 2008, the entire contents of which are incorporated by reference.

TECHNICAL FIELD

The disclosure relates to an optical cable with micromodules, which contain at least one optical waveguide.

BACKGROUND

An optical cable comprises a large number of optical transmission elements for transmitting light from at least one transmission unit to a plurality of reception units. The optical transmission elements are arranged within the cable. The quality of the transmission of light through the optical transmission elements can be determined, for example, by means of attenuation which occurs as light is guided through the optical transmission elements. In particular in the case of a bend in the optical cable about small radii, an increase in the attenuation can take place. Furthermore, the cable being subjected to a tensile force can also result in an increase in the attenuation. In the case of the bend as well as in the case of tensile loading of the optical cable, a considerable increase in the attenuation can occur in some of the optical transmission elements, whereas other optical transmission elements merely demonstrate a slight rise in the attenuation.

There is therefore a need for an optical cable in which the optical transmission elements contained in the cable have approximately identical optical properties in the event of the cable being subjected to a tensile force.

SUMMARY

In one possible embodiment, an optical cable comprises a plurality of optical transmission elements, which contain at least one optical waveguide, and furthermore a cable sheath, which surrounds the plurality of optical transmission elements. The at least one of the plurality of optical transmission elements is arranged in such a way that it is rotated at least through 360° in helical fashion about a longitudinal axis of the optical cable in a longitudinal direction of the optical cable on a section of the optical cable whose length is at least one hundred times the cable diameter.

The at least one of the plurality of optical transmission elements can be rotated at least three times through 360° in helical fashion about the longitudinal axis of the optical cable in the longitudinal direction of the optical cable on a section of the optical cable whose length is at least two hundred times the cable diameter.

The at least one of the plurality of optical transmission elements can be arranged in such a way that it is rotated in a first direction on the section of the optical cable and can be arranged in such a way that it is rotated in a second direction, which is different from the first direction, on a further section of the cable which follows on from the section.

The at least one of the plurality of optical transmission elements can be arranged in such a way that it is rotated at least through 360° in helical fashion about the longitudinal axis of the optical cable in the longitudinal direction of the optical cable on the further section of the cable whose length is at least one hundred times the cable diameter.

In accordance with a method for manufacturing an optical cable, a plurality of optical transmission elements, which contain at least one optical waveguide, are arranged in such a way that at least one of the plurality of optical transmission elements is rotated through at least 360° in helical fashion about a longitudinal axis of the optical cable on a section of the optical cable whose length is at least one hundred times the cable diameter. The arrangement comprising the plurality of optical transmission elements is surrounded by a cable sheath.

The plurality of optical transmission elements can be arranged in such a way that the at least one of the plurality of optical transmission elements is rotated at least three times through 360° in helical fashion about the longitudinal axis of the optical cable in the longitudinal direction of the optical cable on the section of the optical cable whose length is at least two hundred times the cable diameter.

The plurality of optical transmission elements can furthermore be arranged in such a way that the at least one of the plurality of optical transmission elements is rotated in a first direction on the section of the optical cable and is rotated in a second direction, which is different from the first direction, on a further section of the optical cable which follows on from the section.

The plurality of optical transmission elements can also be arranged in such a way that the at least one of the plurality of optical transmission elements is rotated in the second direction at least through 360° in helical fashion about the longitudinal axis of the optical cable in the longitudinal direction of the optical cable on the further section of the optical cable whose length is at least one hundred times the cable diameter.

After the step involving the arrangement of the plurality of optical transmission elements, the cable sheath can be extruded around the plurality of optical transmission elements.

Once the plurality of optical transmission elements have been arranged, at least one layer of strain-relief elements can be arranged around the plurality of optical transmission elements.

BRIEF DESCRIPTION OF THE DRAWINGS

For clarification purposes, the invention will be explained in more detail below with reference to figures which show the exemplary embodiments of the invention and in which:

FIG. 6 shows a production line for the manufacture of an optical cable.

DETAILED DESCRIPTION

In an embodiment of an optical cable, a length of optical transmission elements which are arranged in the interior of the optical cable can correspond to a length of the cable sheath. In the case of such a cable, an increase in the attenuation of the light power occurs in the event of a tensile-force load. The rise in the attenuation can in particular be attributed to the fact that a tensile force acting on the cable sheath also has an effect on the optical transmission elements, which thus expand.

In order to avoid expansion of the optical transmission elements in the event of the effect of a tensile force on the cable, the optical transmission elements can have an excess length in relation to the cable sheath, which surrounds the optical transmission elements. For example, on a section of the cable, the optical transmission elements can be between 0.1% and 0.5% longer than the cable sheath, which surrounds the optical transmission elements on this section of the cable.

In the case of a cable in which the optical transmission elements have an excess length with respect to the cable sheath, initially only the cable sheath is stretched in the event of a tensile-force load. As a result of the excess length of the optical transmission elements, the tensile force is transmitted to the optical transmission elements with a delay. The tensile-force load does not at first directly bring about an expansion of the optical transmission elements as a result of the excess length of the optical transmission elements. Only when the optical transmission elements are stretched by the tensile force in the interior of the cable does a tensile-force load continuing to act on them result in an expansion of the optical transmission elements in the longitudinal direction.

Figure 1:
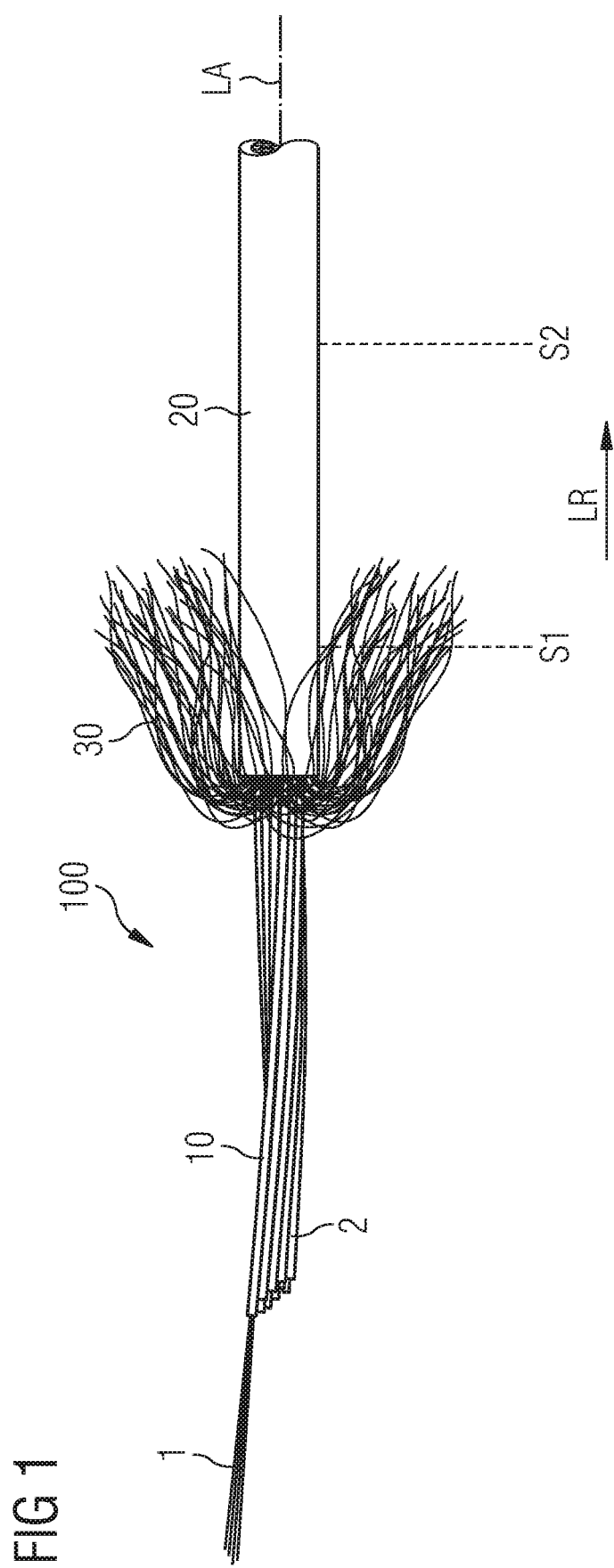
FIG. 1 shows a section of an optical cable in a longitudinal view.

FIG. 1 shows a section of an optical cable 100 in a longitudinal view. As shown in FIG. 1, optical transmission elements 10 are arranged in the interior of the cable, in a cable core. The optical transmission elements each form a micromodule, which contains at least one optical waveguide 1, which is surrounded by a jacket layer 2. In the embodiment shown in FIG. 1, each of the micromodules has, for example, four optical waveguides, which are arranged in the micromodule jacket 2. A large number of optical transmission elements can be arranged within the cable core. The number of optical transmission elements may be, for example, between two and twelve or more micromodules.

The plurality of optical transmission elements 10 are surrounded by a layer of strain-relief elements 30. The strain-relief elements may be, for example, yarns which are provided for absorbing a tensile force acting on the cable. Suitable yarns may be, for example, glass yarns or yarns consisting of aramid. A cable sheath 20 surrounds the optical transmission elements. In the embodiment shown in FIG. 1, the cable sheath is arranged around the layer of strain-relief elements 30.

Figure 2:
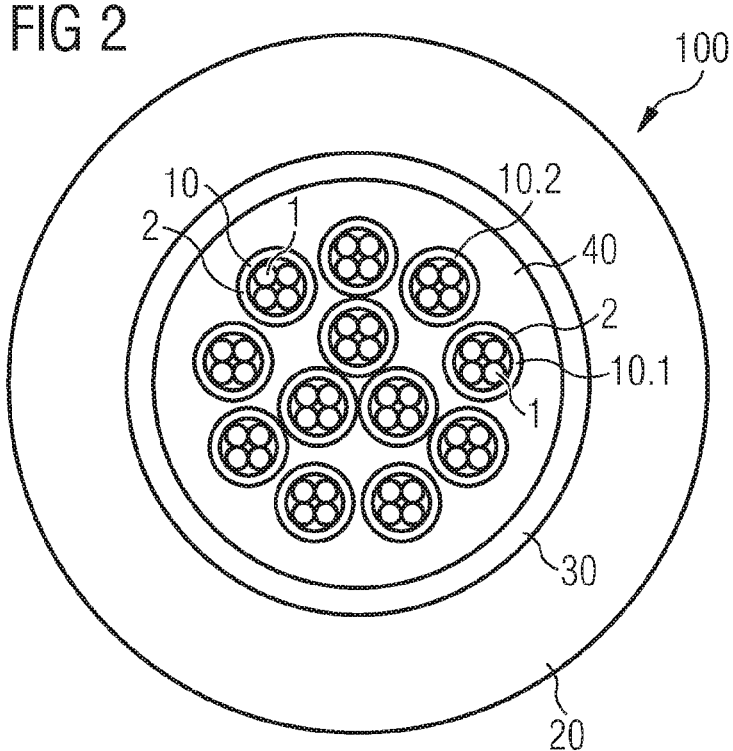
FIG. 2 shows a cross section through an optical cable at one cross-sectional area of the cable.

The further design of the cable will be explained with reference to FIGS. 2 and 3, which each show a cross section of the cable shown in FIG. 1. FIG. 2 shows a cross section of the optical cable at the point denoted by S1 in FIG. 1.

Figure 3:
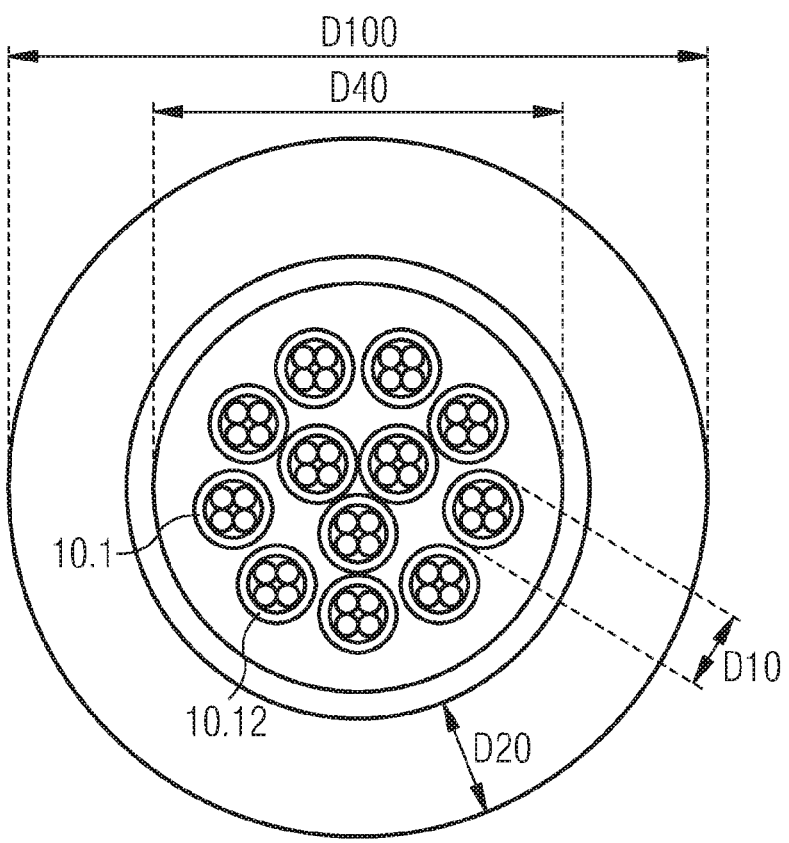
FIG. 3 shows a cross section through an optical cable at a further cross-sectional area of the cable.

FIG. 3 shows a cross section through the optical cable at a point on the cable which is denoted by S2 in FIG. 1 and is offset with respect to the point S1 in a longitudinal direction LR of the cable.

An optical transmission element 10.1, which is in the right-hand region of the cable core 40 at the point S1 of the cable as shown in FIG. 2, can be found in the left-hand region of the cable core at the point S2 of the optical cable as shown in FIG. 3. The change in the position of the optical transmission element 10.1 can be attributed to a helical rotation of the optical transmission element 10.1 in the cable core. The optical transmission element 10.1 is arranged in the longitudinal direction LR of the optical cable on a section of the cable between the point S1 and the point S2 in helical fashion with a pitch about a longitudinal axis LA (shown in FIG. 1) of the optical cable.

The dimensions of the optical cable, the cable core and the optical transmission elements are explained with reference to FIG. 3. The diameter D10 of the micromodules is selected to be between 0.5 mm and 1.5 mm, depending on the number of optical waveguides. If, for example, an optical transmission element contains four optical waveguides, the optical transmission element has a diameter of 0.85 mm.

The diameter D40 of the cable core may be between 5.0 mm and 7.0 mm. Given such diameters, it is ensured that the optical transmission elements are arranged loosely in the cable core. If, for example, twelve micromodules with in each case four optical waveguides are provided in the cable core, the cable core can be manufactured, for example, with a diameter of 5.0 mm in order to ensure the loose arrangement of the optical transmission elements in the interior of the cable core.

The cable sheath 20 may have, for example, a wall thickness D20 which is between 1.0 mm and 1.5 mm, typically 1.3 mm. The cable sheath can have a thermoplastic material which is extruded around the layer of strain-relief elements. It can contain, for example, a flame-retardant, noncorrosive material (FRNC material). Given a sheath wall thickness of 1.3 mm, the optical cable is characterized by a high crush resistance. Depending on the number of micromodules in the interior of the cable, the optical cable has a diameter which is smaller than 10 mm. For example, the optical cable can have a diameter of 7.6 mm when using four micromodules and a diameter of 9.0 mm when using twelve micromodules in the interior of the cable core.

Figure 4:
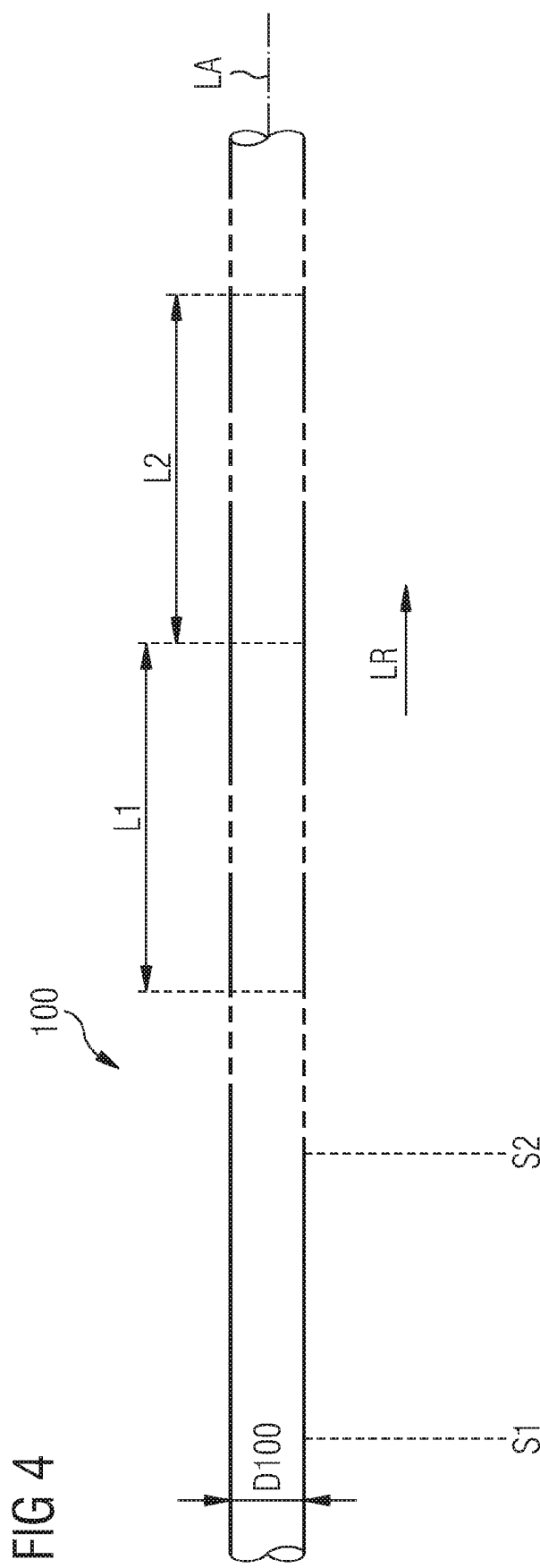
FIG. 4 shows a longitudinal view of an optical cable.

FIG. 4 shows a longer section of the optical cable. At least one of the optical transmission elements is arranged in such a way that it is rotated in helical fashion through a specific angle in a longitudinal direction of the cable along a section L1. All of the optical transmission elements 10 provided in the cable core can also be arranged in such a way that they are rotated through a specific angle in helical fashion about the longitudinal axis LA. The optical transmission elements can be twisted in helical fashion with respect to one another in particular when a plurality of or all of the optical transmission elements contained in the cable core 40 are arranged in such a way that they are rotated with a high pitch.

The angle range is selected such that at least one of the optical transmission elements, for example the optical transmission element 10.1, or else each of the optical transmission elements is rotated at least once through 360° about the longitudinal axis of the optical cable in helical fashion on the cable section L1. The entire cable interior with the large number of optical transmission elements 10.1, . . . , 10.12 can be rotated, for example, between an angle of one times 360° and three times 360° on the cable section L1 about the longitudinal axis of the optical cable.

The section L1 has a length which corresponds, for example, to at least one hundred times the cable diameter D100. The distance of a pitch of the optical transmission element or the distance of a complete 360° rotation of the optical transmission element in the longitudinal direction of the cable can be selected, for example, such that it is one hundred to two hundred times the cable diameter.

The rotation of at least one or all of the optical transmission elements 10 takes place on the section L1 of the cable whose length corresponds to one hundred to two hundred times the cable diameter D100 in a certain direction. On a section L2 which follows on from the section L1, the direction of rotation of the optical transmission elements changes. For example, the optical transmission elements 10 can be twisted towards the left in helical fashion about the longitudinal axis LA of the cable along the section L1 of the optical cable, whereas they are twisted towards the right in helical fashion about the longitudinal axis LA of the cable along the section L2 of the optical cable which adjoins the section L1.

The pitch at which the micromodules 10 are wound in helical fashion about the longitudinal axis of the cable is selected such that the micromodules 10 are rotated through at least one times 360° along one of the sections of the cable in the longitudinal direction of the cable and the section corresponds to at least one hundred times the cable diameter. It has been shown that the pitch can be selected such that the optical transmission elements 10 in the cable core 40 are twisted between one and three times about 360° towards the left or right with respect to one another in helical fashion before the direction of rotation is changed.

Given an outer diameter of the cable of 10 mm, the optical transmission elements can be arranged in such a way that they are rotated through a complete 360° rotation in helical fashion about the longitudinal axis of the cable on a cable section of 2 m, for example. If the optical transmission elements are twisted once through a complete 360° rotation towards the left on a section of the optical cable of 2 m in length, for example, they are arranged in such a way that they are twisted through 360° towards the right on the next length section of the cable, which likewise has a length of 2 m, for example.

As a result of the high pitch of the helically wound micromodules and the dimensions D10 of the micromodules and D40 of the cable core, the optical transmission elements are displaceable with respect to one another within the cable core. As a result, the optical cable 100 has a high degree of flexibility. The cable can therefore also be bent through small bending radii without a significant increase in the attenuation occurring on the transmission of light through the optical transmission elements. Furthermore, the high pitch of the helically rotated optical transmission elements and the loose arrangement of the micromodules ensures that each of the optical transmission elements can be removed from the cable easily.

In order to connect a reception station to the optical cable, openings are cut into the cable sheath 20 for example at a specific interval. The optical transmission element is severed at a first opening which is further removed from a transmission station. At a second opening in the cable sheath which is positioned closer to the transmission station, the severed optical transmission element is drawn back within the cable core and removed from the second opening As a result of the high pitch of the transmission elements arranged in the form of a coil and the loose arrangement of the optical transmission elements within the cable core, the optical transmission elements can be drawn back on a length of between four and ten meters between the two openings and removed from the cable sheath. In order that the optical transmission elements can be displaced very easily with respect to one another, the cable core can be designed to be free from filling compound.

The helical arrangement of the optical transmission elements within the cable core takes place during manufacture of the cable by means of an oscillation of the micromodules 10. As a result of the oscillation of the optical transmission elements 10, all of the optical transmission elements 10 contained in the cable core 40 have approximately the same length. If, for example, the optical transmission elements are manufactured with an excess length of 0.2% with respect to the cable sheath, the oscillating arrangement of the optical transmission elements in the cable core makes it possible to achieve a situation in which the length of all of the optical transmission elements fluctuates merely with a discrepancy of ±0.05% around the desired excess length of 0.2%. The length-related scatter of the individual optical transmission elements 10 can be markedly reduced by the helical arrangement of the micromodules with a high pitch with respect to an optical cable in which the optical transmission elements are arranged with a longitudinal extent.

Figure 5:
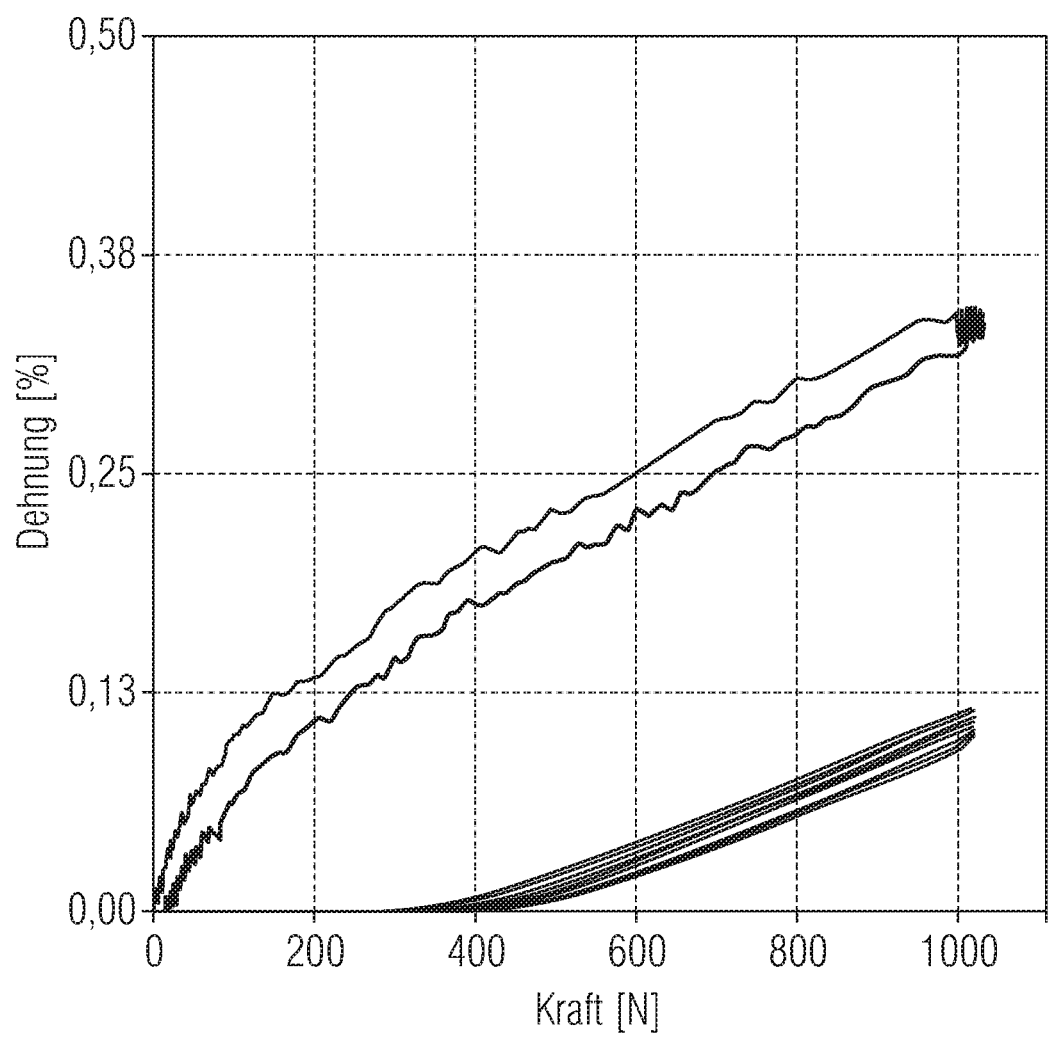
FIG. 5 shows expansion of components of an optical cable as a function of a tensile-force load.

FIG. 5 shows the expansion response of the helically arranged optical transmission elements 10.1, . . . , 10.12 and, by way of comparison, the expansion response of the cable sheath 20 in each case given a tensile-force load of the optical cable of up to 1000 N. An expansion of the materials of the cable sheath occurs even in the case of a low tensile-force load. Given a tensile-force load of approximately 1000 N, the increase in length of the cable sheath in comparison with the original length of the cable sheath is approximately 0.35%. Owing to the excess length of the micromodules 10.1, . . . , 10.12, the length of the micromodules is only changed given a tensile force of approximately 400 N. Given a tensile force of 1000 N, the expansion of the optical transmission elements is less than 0.13% in comparison with their original length. Owing to the helical arrangement of the optical transmission elements as a result of the oscillation of the optical transmission elements during the production of the optical cable, it can be ensured that a limit value for the expansion of the micromodules is not exceeded.

In addition to the small degree of change in length given a tensile-force load, the scatter of the length of the micromodules is also very low. This means that the optical properties of the micromodules differ from one another only to a small extent given a tensile-force load. For example, the optical transmission elements have a similar attenuation response under the action of stress owing to a tensile force or else as a result of a bend.

FIG. 6 shows a production line for the manufacture of the optical cable 100 in a schematic illustration. The optical transmission elements which each contain one or more optical waveguides which are surrounded by a thin tube are first wound onto storage drums R1. The optical transmission elements 10 feed from the drums R1 into a section V1 of a processing unit V. In the region V1 of the processing unit V, the oscillation of the optical transmission elements takes place by means of an oscillation apparatus O.

The oscillation is carried out in such a way that the micromodules over a distance of at least one hundred times the cable diameter are first twisted in helical fashion at least once through 360° in the one direction. The oscillation in one direction takes place, for example, until the optical transmission elements have been twisted in helical fashion with respect to one another one times to three times through 360° along a cable section whose length corresponds to one hundred to two hundred times the cable diameter, for example.

Then, the direction of rotation of the oscillation apparatus O in the region V1 of the processing unit V is changed. The oscillation of the optical transmission elements in the changed direction of rotation now takes place through at least once 360° on a length of the cable which corresponds to at least one hundred times the cable diameter. For example, the optical transmission elements are rotated through one times to three times 360° in the helical fashion in the opposite direction on a cable section which corresponds to one hundred to two hundred times the cable diameter.

The strain-relief elements 30 which are arranged on the drums R2 feed into a region V2 of the production unit V. The strain-relief elements can contain, for example, yarns made from glass or aramid. The strain-relief elements are arranged in one or more layers about the optical transmission elements 10.

The cable sheath 20 is extruded in the region V3 of the processing unit V. A polymer mixture made from a flame-retardant, noncorrosive material (FRNC material) is located in a tank B which is connected to the processing unit. The polymer mixture is heated and the polymer melt is fed to the region V3 of the processing unit V. The region V3 of the processing unit V comprises an extruder, by means of which the polymer melt is extruded around the layer of strain-relief elements 30. After cooling of the polymer melt, the optical transmission elements are protected by the cable sheath 20.

All of the processing steps can be carried out in one working step in the processing unit V without it being necessary to wind intermediate products of the cable onto storage rollers again and later to supply them to a separate production unit downstream.

After the extrusion of the cable sheath, the optical cable 100 passes through a water bath W. The optical cable 100 is deflected on a deflection roller U and passed through the water bath again. The deflection roller U allows for the cooling section to be extended. The finished optical cable is rolled onto the storage drum S after cooling.

At the deflection roller U, the optical transmission elements which are first rotated in helical fashion in one direction are coupled. The twisting of the optical transmission elements in one direction is fixed when the optical cable passes over the deflection roller U. This prevents the optical transmission elements 10 from being rotated back in the event of a change in the direction of rotation of the oscillation apparatus O. In order to better fix the micromodules which are rotated in helical fashion with respect to one another, the optical cable can also be passed around the deflection roller a plurality of times, for example.

Furthermore, fixing of the micromodules 10 which are ground in helical fashion with respect to one another takes place by means of the strain-relief elements 20. Owing to their intrinsic weight, the micromodules rest on the layer of yarns and are fixed thereby in terms of their direction of rotation. In order to prevent the optical transmission element from rotating back in the event of a change in the direction of rotation, the helical arrangement takes place with a high pitch. In order to achieve the high pitch, the optical transmission elements are twisted between one times and three times through 360° in one direction on a distance which corresponds to one hundred to two hundred times the cable diameter before the direction of rotation is changed in the processing unit V1.

As a result of the oscillation of the optical transmission elements, the length of the individual micromodules can be matched to one another. Thus, the length scatter of the optical transmission elements can be reduced. It is possible, for example, to produce optical cables in which the micromodules are arranged in the interior of the cable core with a discrepancy of ±0.05% from a desired excess length of 0.2% with respect to the cable sheath protecting them. The optical transmission elements thus have a similar response with respect to their optical properties in the event of a tensile force acting on the cable, with the result that, in the case of a tensile-force loading of the cable, approximately identical attenuation takes place with all of the optical transmission elements.

LIST OF REFERENCE SYMBOLS

1 Optical waveguide
2 Jacket
10 Optical transmission element, micromodule
30 Strain-relief elements
20 Cable sheath
40 Cable core
100 Optical cable
R Roller
V Processing unit
U Deflection roller
W Water bath
S Storage drum

What is claimed is:

1. An optical cable, comprising: a plurality of optical transmission elements, each having at least one optical waveguide; and a cable sheath surrounding the plurality of optical transmission elements, wherein the plurality of optical transmission elements is helically rotated between an angle of one times 360° and three times 360° about a longitudinal axis of the optical cable in a longitudinal direction along a section of the optical cable whose length is at least one hundred times a diameter of the cable, and wherein the distance of a complete 360° rotation of the plurality of optical transmission elements in the longitudinal direction of the cable is one hundred to two hundred times the cable diameter; wherein the optical transmission elements are between 0.1% and 0.5% longer than the cable sheath.

2. An optical cable, comprising: a plurality of optical transmission elements, each having a plurality of optical fibers and a polymer jacket surrounding the plurality of optical fibers; a polymer cable sheath surrounding the plurality of optical transmission elements; and strain-relief elements arranged between the plurality of optical transmission elements and the cable sheath, wherein the strain-relief elements contain at least one of aramid yarn and glass yarn, wherein the plurality of optical transmission elements is helically rotated between an angle of one times 360° and three times 360° about a longitudinal axis of the optical cable in a longitudinal direction along a section of the optical cable whose length is at least one hundred times a diameter of the cable, and wherein the distance of a complete 360° rotation of the plurality of optical transmission elements in the longitudinal direction of the cable is one hundred to two hundred times the cable diameter; wherein the optical transmission elements are between 0.1% and 0.5% longer than the cable sheath.

3. An optical cable, comprising:
optical transmission elements, each having at least one optical waveguide, wherein the plurality of optical transmission elements differ from one another in terms of their respective lengths by less than 0.05%; and
a cable sheath surrounding the optical transmission elements, wherein the optical transmission elements have an excess length in relation to the cable sheath, and wherein the optical transmission elements are between 0.1% and 0.5% longer than the cable sheath, whereby tensile force is transmitted to the optical transmission elements with a delay while the cable sheath is stretched in the event of a tensile-force load,
wherein the optical transmission elements are helically rotated between an angle of one times 360° and three times 360° about a longitudinal axis of the optical cable in a longitudinal direction along a section of the optical cable whose length is at least one hundred times a diameter of the cable, wherein the distance of a complete 360° rotation of the plurality of optical transmission elements in the longitudinal direction of the cable is one hundred to two hundred times the cable diameter.

* * * * *